US011310050B2

(12) United States Patent
Zavertnik et al.

(10) Patent No.: US 11,310,050 B2
(45) Date of Patent: Apr. 19, 2022

(54) VERIFYING A COMPUTING DEVICE AFTER TRANSPORT

(71) Applicant: Microsoft Technology Licensing, LLC, Redmond, WA (US)

(72) Inventors: Gregory J. Zavertnik, Mountain House, CA (US); Vishwajit Tumkur Mahalingappa, Bengaluru (IN); Soumya Jain, Bengaluru (IN); Vimalraj Vasudevan Thekkoot, Sunnyvale, CA (US); Karthikeyan Nagarathinam, Cupertino, CA (US); Sampath Kumar Victor, Sunnyvale, CA (US); Varsha Jagdale, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 556 days.

(21) Appl. No.: 16/244,411

(22) Filed: Jan. 10, 2019

(65) Prior Publication Data

US 2020/0092103 A1 Mar. 19, 2020

Related U.S. Application Data

(60) Provisional application No. 62/732,364, filed on Sep. 17, 2018.

(51) Int. Cl.
*H04L 9/32* (2006.01)
*H04L 9/30* (2006.01)
(Continued)

(52) U.S. Cl.
CPC .............. *H04L 9/3234* (2013.01); *G06F 8/63* (2013.01); *G06F 9/45558* (2013.01);
(Continued)

(58) Field of Classification Search
CPC ....... H04L 9/3234; H04L 9/30; H04L 9/0897; H04L 9/0894; H04L 9/321; H04L 9/3265;
(Continued)

(56) References Cited

U.S. PATENT DOCUMENTS 9,219,607 B2    12/2015  Nakhjiri
10,461,942 B1 * 10/2019  Vo .......................... H04L 9/085
2009/0204806 A1  8/2009  Kanemura et al.
(Continued)

FOREIGN PATENT DOCUMENTS

WO    2007094035 A1   8/2007
WO    2017100303 A1   6/2017

OTHER PUBLICATIONS

"TCG Specification Architecture Overview—Revision 1.4", Retrieved From: https://trustedcomputinggroup.org/wp-content/uploads/TCG_1_4_Architecture_Overview.pdf, Aug. 2, 2007, 54 Pages.
(Continued)

*Primary Examiner* — Mohammad W Reza
(74) *Attorney, Agent, or Firm* — Alleman Hall Creasman & Tuttle LLP (57) ABSTRACT

One example provides a method for authenticating a computing device received from a manufacturer, the method including establishing a secured connection with the computing device, receiving, from the computing device, a first set of security artifacts, and retrieving, from a secure cloud storage location, a second set of security artifacts, the second set of security artifacts including the EK public key and the PCR values for the computing device obtained during manufacturing. The method further comprises, when the first set of security artifacts matches the second set of security artifacts, then verifying the computing device as trusted and permitting communication between the computing device and a secured computing environment, and when the first set of security artifacts does not match the second set of security
(Continued)

artifacts, then not verifying the computing device as trusted and not permitting communication between the computing device and the secured computing environment.

12 Claims, 8 Drawing Sheets (51) Int. Cl.
    *G06F 9/455*     (2018.01)
    *H04L 9/08*     (2006.01)
    *G06F 8/61*     (2018.01)

(52) U.S. Cl.
    CPC .............. *H04L 9/0897* (2013.01); *H04L 9/30* (2013.01); *G06F 2009/45587* (2013.01); *G06F 2009/45595* (2013.01)

(58) Field of Classification Search
    CPC .................. G06F 9/45558; G06F 8/63; G06F 2009/45587; G06F 2009/45595; G06F 2221/034; G06F 21/57; G06F 21/44; G06F 3/0647
    See application file for complete search history.

(56) References Cited

U.S. PATENT DOCUMENTS

| | | |
|---|---|---|
| 2010/0332820 A1 | 12/2010 | Matsushima et al. |
| 2011/0302415 A1 | 12/2011 | Ahmad et al. |
| 2012/0131333 A1* | 5/2012 | Zhang ................ H04N 21/4627 713/156 |
| 2016/0275461 A1 | 9/2016 | Sprague et al. |
| 2017/0070486 A1* | 3/2017 | Lyons ................ H04L 63/0442 |
| 2017/0201488 A1* | 7/2017 | Krywaniuk ............. H04L 41/00 |
| 2019/0020647 A1 | 1/2019 | Sinha et al. |

OTHER PUBLICATIONS

"International Search Report and Written Opinion Issued in PCT Application No. PCT/US19/038849", dated Aug. 9, 2019, 13 Pages.

"TCG Infrastructure WG TPM Keys for Platform Identity for TPM 1.2", Retrieved from:«https://trustedcomputinggroup.org/wp-content/uploads/TPM_Keys_for_Platform_Identity_v1_0_r3_Final.pdf», Aug. 21, 2015, 68 Pages.

Bare, J. Christopher., "Attestation and Trusted Computing", Retrieved from, «https://courses.cs.washington.edu/courses/csep590/06wi/finalprojects/bare.pdf», Mar. 2006, 10 Pages.

Berdy, Nicole, "Device Provisioning: Identity Attestation with TPM", Retrieved from: «https://azure.microsoft.com/en-us/blog/device-provisioning-identity-attestation-with-tpm/», Nov. 7, 2017, 8 Pages.

Zimmerman, Miriam, "Virtual Trusted Platform Module for Shielded VMs: Security in Plaintext", Retrieved from «https://cloud.google.com/blog/products/gcp/virtual-trusted-platform-module-for-shielded-vms-security-in-plaintext», Aug. 6, 2018, 7 Pages.

* cited by examiner

VERIFYING A COMPUTING DEVICE AFTER TRANSPORT

CROSS REFERENCE TO RELATED APPLICATIONS

This application claims priority to U.S. Provisional Patent Application Ser. No. 62/732,364, filed Sep. 17, 2018, the entirety of which is hereby incorporated herein by reference for all purposes.

BACKGROUND

Computer hardware may be transported from one physical location to another physical location via a courier. As such, the computer hardware may be vulnerable to tampering when outside a trusted environment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to verifying an authenticity and integrity of a computing device received from a manufacturer based upon information obtained from the computing device during manufacturing. One example provides a method for manufacturing a computing device. The method comprises installing a disk image on the computing device, obtaining a set of security artifacts from a trusted platform module (TPM) of the computing device, the set of security artifacts comprising an endorsement key (EK) public key and platform configuration register (PCR) values, and sending the security artifacts obtained to a cloud storage location via a secure channel.

Another example provides a method for authenticating a computing device received from a manufacturer. The method comprises establishing a secured connection with the computing device; receiving, from the computing device, a first set of security artifacts including an endorsement key (EK) public key and platform configuration register (PCR) values; and retrieving, from a secure cloud storage location, a second set of security artifacts for the computing device, the second set of security artifacts including the EK public key and the PCR values for the computing device obtained during manufacturing of the computing device. The method further comprises, when the first set of security artifacts matches the second set of security artifacts, then verifying the computing device as trusted and permitting communication between the computing device and a secured computing environment, and when the first set of security artifacts does not match the second set of security artifacts, then not verifying the computing device as trusted and not permitting communication between the computing device and the secured computing environment.

DETAILED DESCRIPTION

Transferring a large amount of data (e.g., terabytes, petabytes) to a cloud storage location via a network connection may be time-consuming and may impact network performance. Thus, to more quickly and conveniently upload large amounts of data to a cloud storage location, a cloud services host company may ship a data migration computing device to a customer onto which the customer may load large amounts of data. The data migration computing device then may be physically shipped back to the host for uploading of the customer data to a data center.

Shipping of a data migration computing device may pose various security risks, as compromise of the data migration computing device can compromise the security of the customer's network and data, as well as the security of the host's cloud environment. However, it may be difficult to prevent tampering with or spoofing of the computing device during transit or other instances in which the computing device is outside of a trusted environment.

As one potential solution, a trusted courier may be used to transport a data migration computing device from a host to a user, and then back to the host. Further, security information that would be altered in the event of device compromise may be read before and after shipment to/from the customer to ensure the values match expected values. While such measures may be effective to help prevent compromise when shipping to/from customers, the device still may be vulnerable to tampering when it is initially shipped from the manufacturer to the host.

Accordingly, examples are disclosed that relate to verifying a computing device after transport to help detect any device compromise that occurs between manufacturing of a computing device and receipt by the initial customer, such as a host of cloud services. Briefly, the verification process includes, during manufacturing, obtaining a first set of security artifacts from a trusted platform module (TPM) residing on the computing device and sending the first set of security artifacts out-of-band to a secure cloud storage location via a secure channel. This may be performed during a disk imaging process, or at any other suitable time. When the computing device arrives at the host, the computing device is connected to an authentication system within a secured computing environment in such a manner that the computing device is communicatively insulated from any devices other than the authentication system. The authentication system obtains a set of the same security artifacts from the computing device that were obtained during manufacturing, and determines whether the second set of security artifacts received from the computing device during authentication matches the first set of security artifacts obtained during manufacturing. When the first and second sets of security artifacts match, the computing device is verified as trusted and permitted to communicate within the secured computing environment. When the first and second sets of security artifacts do not match, the computing device is not verified as trusted and is not permitted to communicate within the secured computing environment. The verification process may be automated to help to reduce time and/or expense of device verification at the host compared to a manual inspection process. Further, the disclosed examples may help to reduce a likelihood of introducing errors (e.g., human or other) which may arise during a manual inspection process.

While described herein in the context of data migration computing devices, the disclosed examples may be used to ensure the secure initial shipment of any other suitable type of computing device. For example, computer hardware configured to build a cloud-provided product or service may permanently reside in a data center or other secured computing environment after manufacturing, but may be vulnerable to security compromise when transported from a manufacturer(s) to the data center, and thus may pose similar risks as a data migration computing device. The disclosed examples also may be used to authenticate and verify trustworthiness of consumer products.

Figure 1:
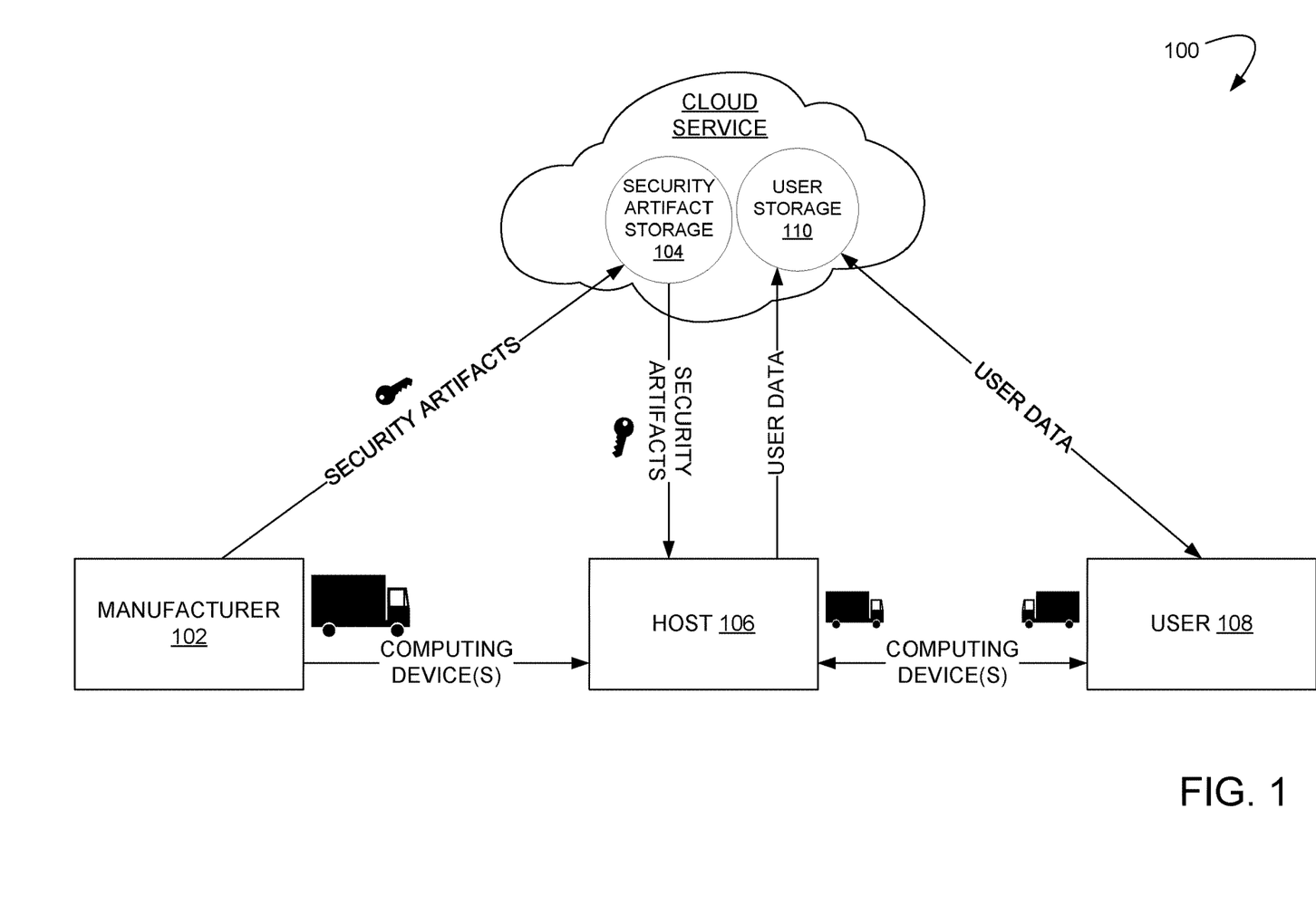
FIG. 1 schematically shows an example use environment for implementing a computing device verification process.

FIG. 1 schematically shows an example use scenario 100 in which post-transport verification processes may be implemented. In this example, a manufacturer 102 assembles a data migration computing device (or other suitable computing device) according to a specification provided by the host 106, which may include firmware and/or software installation and various system configurations. During manufacturing, a first set of security artifacts are obtained from a trusted platform module (TPM) residing on the computing device and sent to a secure cloud storage location 104 via a secure channel. The manufacturer 102 ships the computing device to a host 106 (e.g. a cloud storage service) via a courier (e.g., truck, aircraft, train, etc.). As described in more detail below with reference to FIGS. 4A and 4B, the host 106 receives the computing device, collects a second set of the security artifacts from the computing device, and retrieves the first set of security artifacts for the computing device from the secure cloud storage location 104. The host 106 compares the first and second sets of security artifacts during an authentication and attestation process to determine validity and trustworthiness of the computing device. When the computing device is verified as trusted, the host 106 may permit the computing device to communicate with the secured computing environment at the host 106, and also may ship the computing device to a user 108.

Upon receipt of the computing device, the user 108 transfers locally-stored data to the computing device and ships the computing device with the data back to the host 106, where the computing device undergoes another authentication and attestation process. After it is again verified as trusted, the computing device is connected to the cloud storage system, and the stored data is migrated to a cloud storage location 110 for the user 108.

As mentioned above, the manufacturer 102 builds the computing devices according to a specification provided by the host 106. As such, the host 106 may provide various resources to the manufacturer 102 to facilitate device manufacturing. For example, the host 106 may provide a disk image and resources for installing the disk images onto the computing devices. To allow the secure extraction and upload of security artifacts during manufacturing, the host may provide monitoring software components to the manufacturer to operate in conjunction with the disk imaging system and/or other suitable manufacturing resources.

Figure 2:
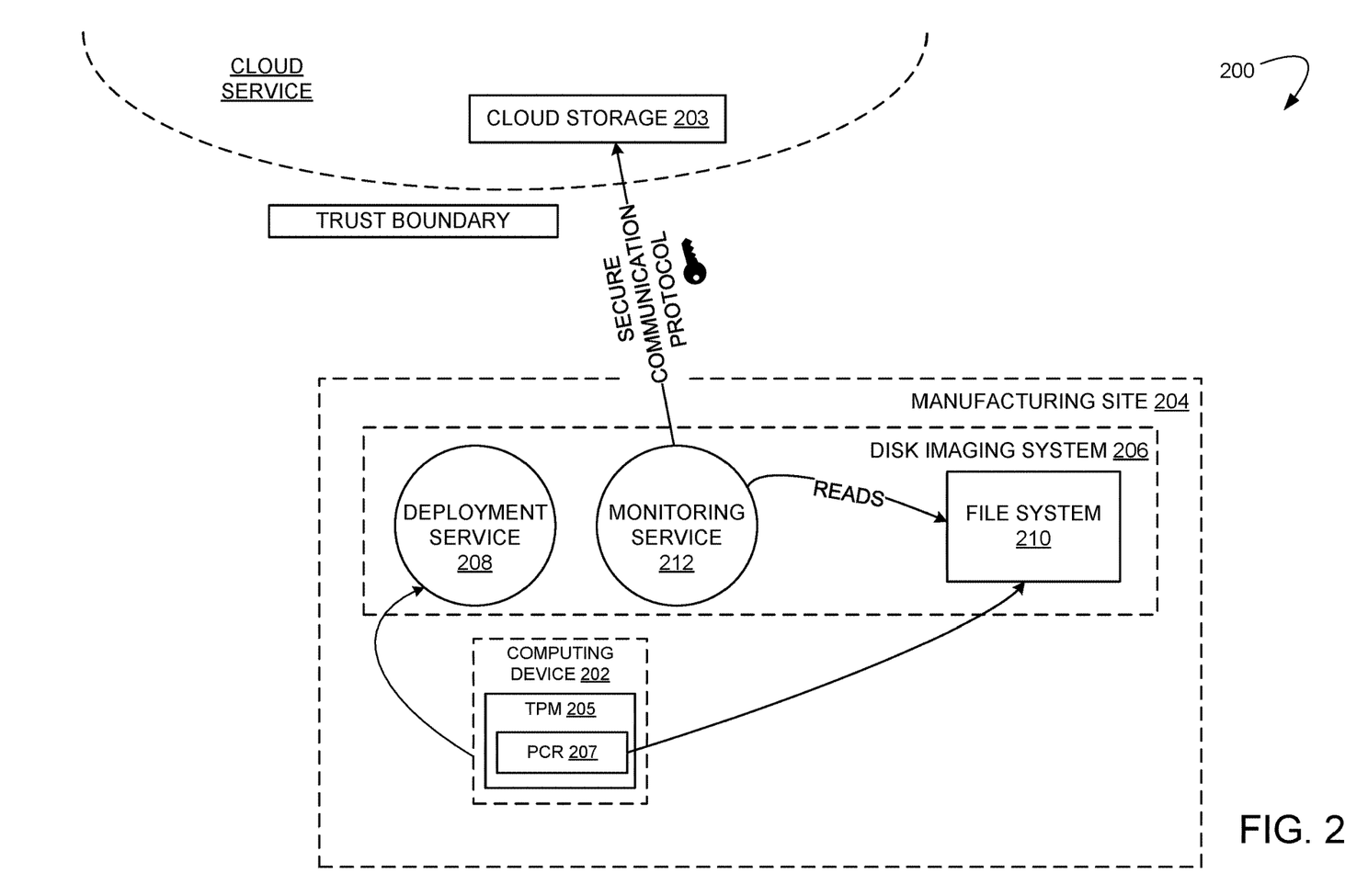
FIG. 2 schematically shows an example process for manufacturing a computing device.

FIG. 2 shows a schematic depiction of an example manufacturing environment 200 in which a computing device 202 is at least partially manufactured at a manufacturing site 204. Each computing device 202 includes a trusted platform module (TPM) 205, which may be implemented as a tamper-resistant integrated circuit. The TPM maintains an endorsement key (EK) pair comprising a public key (referred to herein as the "EK public key") and a private key (referred to herein as the "EK private key") specific to the computing device 202. In addition to key management, the TPM also may perform key generation. For example, the TPM may be configured to generate an attestation identity key (AIK). Further, as described in more detail below, the TPM includes a memory location (platform configuration register (PCR)) 207 which holds values (PCR values) representing measurements taken during a boot process.

Once assembled according to a product specification, the computing device 202 is connected to a disk imaging system 206 for software installation and various system configurations. Disk imaging system 206 hosts a deployment service 208 and a local file system 210. In some examples, the disk imaging system 206 comprises a server of a preboot execution environment (PXE), and the computing device 202 comprises a PXE-enabled client. Deployment service 208 comprises stored instructions executable by the disk imaging system 206 to install a disk image. The computing device 202 then reboots and is run through a set-up process to configure the computing device 202.

After installing the disk image and setting various configuration parameters, the disk imaging system 206 obtains a first set of security artifacts from the TPM 205 residing on the computing device 202, for example, via server message block (SMB) protocol or any other suitable network file sharing protocol. As described above, the security artifacts include PCR values from the TPM 205. In the depicted embodiment, a monitoring service 212 operatively coupled to the file system may monitor the file system 210 and thereby detect the writing of the first set of security artifacts (e.g. a packet exchanged via SMB protocol) to the file system 210. Such monitoring may be performed continuously, at predefined intervals, or based on any suitable trigger. When the monitoring service 212 detects arrival of the security artifacts in the file system 210, the monitoring service 212 may obtain the first set of security artifacts for the computing device 202 from the file system 210 and send the first set of security artifacts out-of-band (separately from the physical shipping of the manufactured computing device) via a secure channel to the secure cloud storage location 203. While the illustrated example depicts the monitoring service 212 as hosted on the disk imaging system 206, the monitoring service 212 may reside in another location with network access to the file system 210.

The first set of security artifacts may include any suitable security information. In addition to the PCR values, the first set of security artifacts includes an endorsement key (EK) public key, and also may include boot logs (e.g., a TCG log, an operating system configuration boot log, etc.).

Any suitable secure communication protocol may be used to upload the security artifacts to the secure cloud storage location 203, including Hypertext Transfer Protocol Secure (HTTPS). Other security measures also may be taken. For example, the host may assign the manufacturer a token which permits the monitoring service 212 to access the secure cloud storage location 203. Any suitable token may be used, including a shared access signature (SAS). In some examples, the token may change after a period of time, such as by being rotated on a periodic or random basis, which may help to further secure the communication channel.

Figure 3:
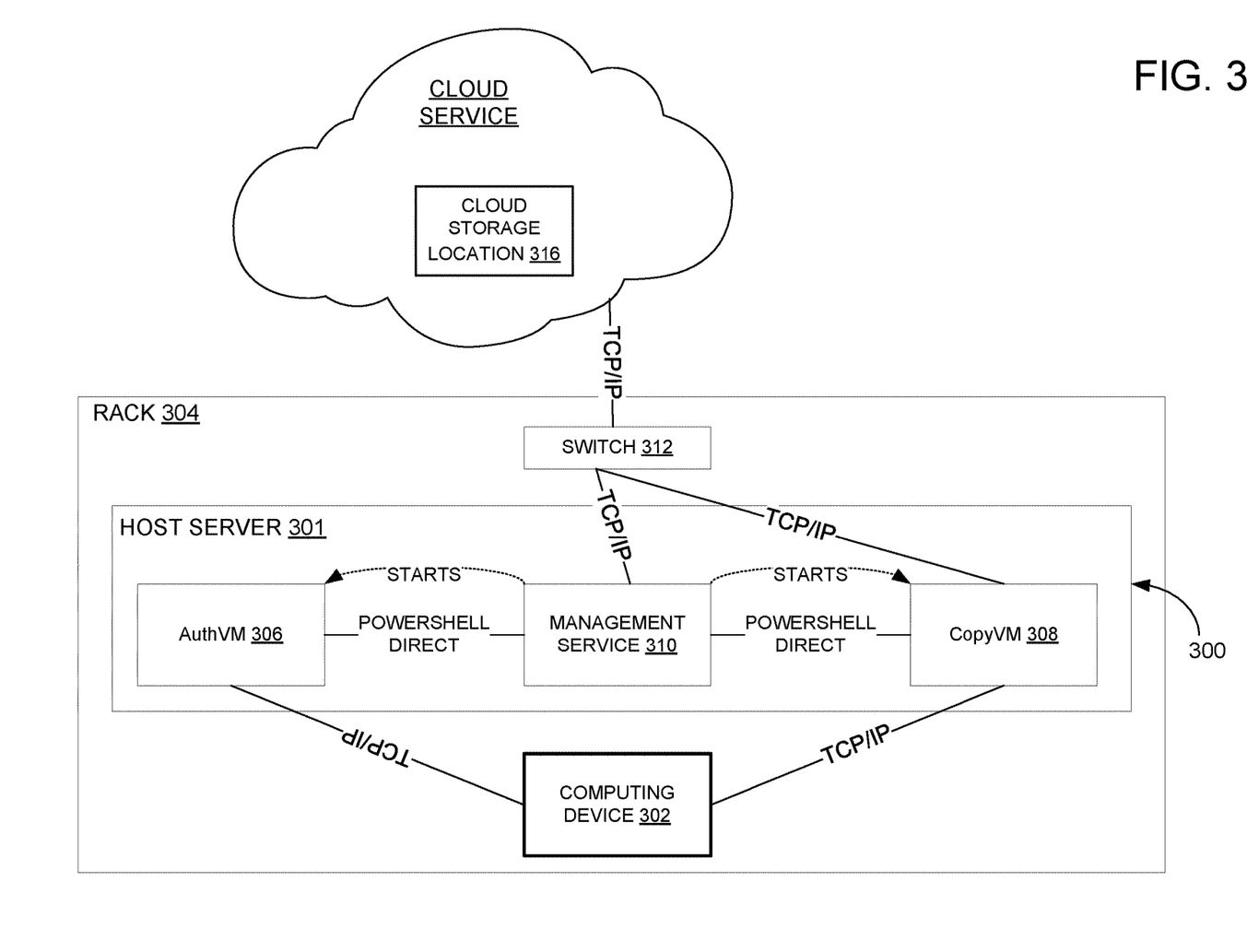
FIG. 3 schematically shows an example architecture for a system for performing computing device authentication and attestation.

After manufacturing, the computing device 202 may be physically transported, e.g. by courier, to the host, such as to a data center of the host. When the computing device arrives at the host, the computing device may be connected to an authentication system to determine validity and trustworthiness of the computing device. FIG. 3 depicts an example authentication system 300 including a host server 301 to which a computing device 302 may be connected. In the illustrated example, the computing device 302 resides within a rack 304 while connected to the host server 301. In other examples, any other suitable hardware configuration may be used. In any instance, the computing device 302 may be connected to the host server 301 in such a manner that the computing device 302 is communicatively isolated from a cloud service system prior to authentication.

Host server 301 comprises a native hypervisor configured to run an authentication virtual machine (AuthVM) 306, a copy virtual machine (CopyVM) 308, and a native virtual machine manager (management service) 310 directly on the host server 301. Management service 310 manages the start and stop of guest virtual machines AuthVM 306 and CopyVM 308, and may act as a liaison for communications between the guest virtual machines. As described in more detail below, the AuthVM 306 assesses a health of the computing device 302 and also may act as a private certificate authority (CA) to sign a certificate during a mutual authentication process between the AuthVM 306 and the computing device 302. Computing device 302, once verified as trusted, may be permitted to communicate with CopyVM 308. CopyVM 408 then can manage various job tasks for the computing device 302, including provisioning, uploading data stored on the computing device 302 to a cloud storage location, cleaning the computing device, performing a factory reset of the computing device, etc.

Upon the formation of an initial connection between the computing device and the host server 301, and any time the computing device 302 reboots while connected to the host server 301, the computing device undergoes an arrival process. During the arrival process, the management service 310 starts a clean version of the AuthVM 306. The AuthVM 306 may broadcast its IP address, to which the computing device 302 may respond. The AuthVM 306 may detect the computing device 302 (e.g., based upon the response) and initiate an authentication and attestation process to verify the computing device 302 as trusted or not trusted.

Figure 4A:
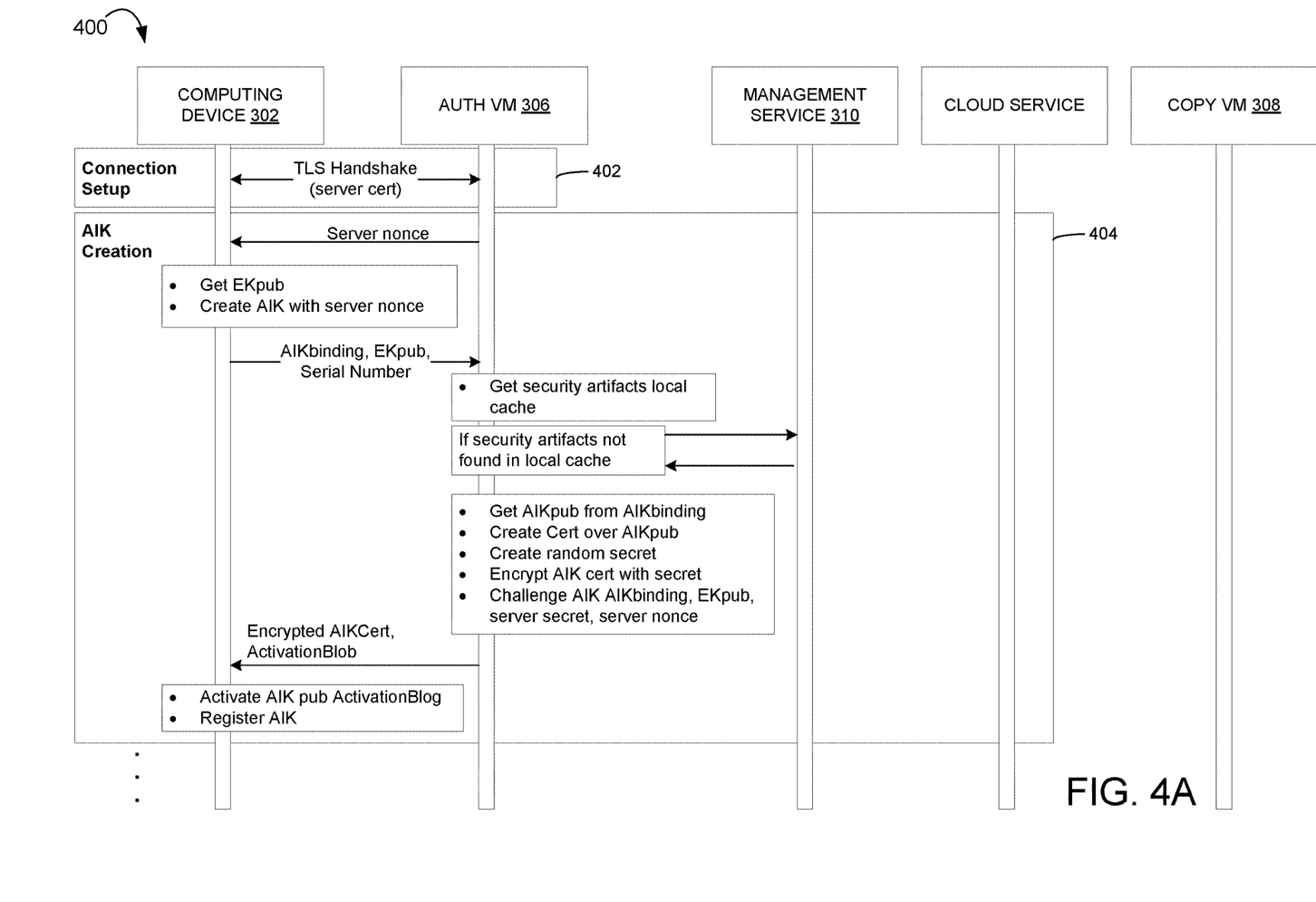
FIGS. 4A and 4B schematically show an example process for computing device authentication and attestation.

FIGS. 4A and 4B schematically show an example authentication and attestation process 400 that may be performed during an arrival process. Beginning with FIG. 4A, process 400 includes a connection setup phase 402 in which the computing device 302 and the AuthVM 306 establish a secured connection. For example, the connection setup 402 may comprise a transport layer security (TLS) handshake protocol in which the AuthVM 306 provides a certificate to the computing device 302 to verify its identity to the computing device 302, and optionally may also request a certificate from the computing device 302. The AuthVM 306 does not have direct access to a cloud storage service (or other cloud network) such that the secure connection between the AuthVM 306 and the computing device 302 isolates the computing device from the secure computing environment. Thus, the computing device 302 may not access the cloud network via the connection to the AuthVM 306.

During the initial connection setup 402, information regarding health of the computing device 302 may be obtained by the AuthVM 306. For example, the computing device 302 may report a message comprising a binary outcome as to whether the computing device 302 is healthy or unhealthy. In some instances, where the message indicates that the computing device is unhealthy, the AuthVM 306 may automatically obtain a support package including one or more logs (e.g. boot logs) from the computing device 302. As described in more detail below, the AuthVM 306 may provide the support package to a system administrator, e.g. for debugging.

After establishing a secured connection with the computing device, the AuthVM 306 attempts to authenticate the computing device 302 as a known computing device. In one example process, an attestation identity key (AIK) creation phase 404 is performed after forming the secure connection. In the AIK creation phase 404, the AuthVM 306 sends a nonce to the computing device 302, which the computing device 302 uses when creating an AIK via the TPM. By creating the AIK using the nonce, the computing device 302 may prove the freshness of the AIK to the AuthVM 306. The computing device 302 also retrieves its EK public key from its TPM and sends the EK public key, a unique serial number or other identifier for the computing device 302, and an AIK binding (created while creating the AIK) to the AuthVM 306.

The AuthVM 306 is configured to perform a high-level attestation by comparing security artifacts from the computing device 302 to expected values. To obtain expected values for comparison to the information received from the computing device, the AuthVM 306 issues a request to the management service 310 to retrieve the first set of security artifacts obtained during manufacturing of the computing device. The AuthVM 306 issues this request based on the unique serial number for the computing device 302 (or other suitable identification unique to the computing device), and the management service 310 may search within a local cache to determine whether the local cache contains the security artifacts for that computing device. In some instances, the local cache may already contain the security artifacts for the computing device 302 from a prior instance in which the computing device 302 connected to the host server 301. If the management service 310 locates the security artifacts within the local cache, it pulls the security artifacts and sends the security artifacts to the AuthVM 306. Otherwise, the management service 310 may retrieve the first set of security artifacts from the cloud storage location to which the security artifacts were uploaded during manufacturing. Returning briefly to FIG. 3, the management service 310 connects via a switch 312 to a cloud service 314 comprising a cloud storage location 316 that contains the first set of security artifacts. In this manner, the management service 310 may provide the security artifacts to the AuthVM 306 and also store a local copy of the security artifacts for accessing at a later time.

AuthVM 306 compares the EK public key received from the computing device to the EK public key obtained during manufacturing, and also verifies the EK public key.

Continuing with FIG. 4A, the AuthVM 306 sends an encrypted AIK certificate and an activation blob created while challenging the AIK to the computing device 302. The computing device 302 activates the AIK based on the activation blob received, and also registers the AIK.

In some examples, a computing device may contain modifications from its manufactured state (e.g., changes to firmware and/or software) that may be undetectable in a standard attestation process in which the computing device proves its trustworthiness via the EK public key and attested logs. Thus, the authentication and attestation process 400 further comprises a platform attestation 406 (FIG. 4B) in which additional individual measurements from the TPM of the computing device 302 that are not expected to change as a result of simply rebooting the computing device 302 are compared to corresponding measurements in the first set of security artifacts obtained during manufacturing. In this manner, the authentication and attestation process 400 may more accurately verify whether the computing device contains as-manufactured settings and configurations.

Figure 4B:
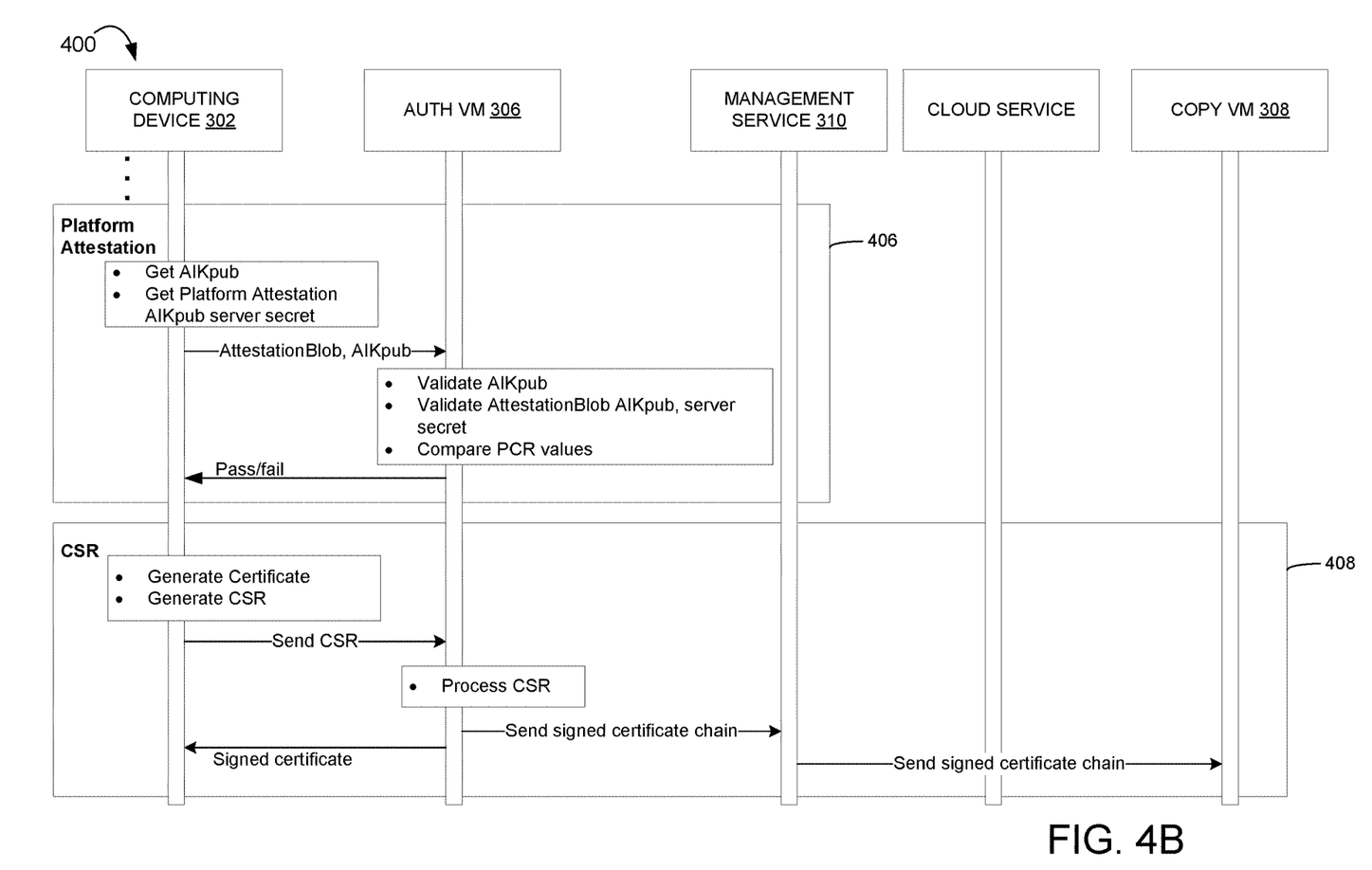

During platform attestation 406, the computing device 302 obtains the AIK public key and also generates a log attestation using suitable random data. In some examples, the computing device generates the log attestation using the random secret generated by the AuthVM 306 and previously used by the AuthVM 306 in encrypting the AIK cert. When the computing device 302 successfully activates the AIK based on the activation blob (which contains the random secret), the computing device 302 obtains the random secret within the activation blob. The computing device 302 then may use this random secret to decrypt the AIK cert and/or encrypt data to be exchanged with the AuthVM 306, for example. Here, the computing device 302 uses the secret to generate information for platform attestation, such as the attested log. In this manner, the secret may act as a nonce, and may prove a freshness of the attested log (or other information generated) to the AuthVM 306. In some examples, using the random secret contained within the activation blob to generate information for platform attestation may help to perform the AIK creation 404 and platform attestation 406 in a continuous manner, without the host server 301 sending another nonce to the computing device 302. In other examples, the computing device 302 may use any other suitable data to generate the log attestation.

AuthVM 306 receives an attestation and the AIK public key from the computing device. AuthVM 306 also validates the AIK public key by comparing the AIK public key received to a stored copy of the AIK public key contained within the AIK binding (sent during the AIK creation phase 404) to determine whether the AIK public key within the AIK binding matches the AIK public key received from the computing device 302. The AuthVM 306 also validates an attested log received from the computing device 302 within the attestation blob.

The AuthVM 306 further compares individual PCR values received from the computing device 302 (in the second set of security artifacts) to PCR values within the first set of security artifacts obtained during manufacturing. If attestation fails based upon a PCR value received from the computing device 302 that does not match a corresponding PCR value in the security artifacts obtained during manufacturing, the authentication system 300 does not verify the computing device 302 as trusted and also does not permit communication between the computing device 302 and the secure computing environment. The authentication system 300 also may provide information to a system administrator identifying the PCR value(s) responsible for failed attestation, as in some instances a specific PCR value identified during a failed attestation may provide insight to an error that caused the PCR value to change.

Failed attestation based upon a PCR value also may help to inform changes to a manufacturing or other workflow process. For example, after manufacturing, a simulation or test involving an operating system hotfix may be performed on the computing device 302, which may change boot code used to boot the computing device 302 and thus may change a PCR value. A failed attestation based upon this changed PCR value may help inform a decision to not apply hotfixes until a computing device is factory reset (e.g., cleaned/sanitized, disks wiped, and/or software reinstalled).

Continuing with FIG. 4B, when all PCR values obtained from the computing device 302 by the AuthVM 306 match the PCR values in the first set of security artifacts obtained from the computing device 302 during manufacturing, and all prior attestation processes were performed successfully, the AuthVM 306 may send a confirmation of successful attestation to the computing device 302, illustrated as a pass/fail message. This confirmation of successful attestation may signal the start of a certificate signing request (CSR) phase 408. During the CSR phase 408, the computing device 402 generates a certificate for connecting to the CopyVM 308 and also generates a CSR for the certificate. The computing device 302 sends the CSR to the AuthVM 306, which processes the CSR and sends a singed certificate to the computing device 302. The AuthVM 306 also may notify the management service 310 regarding a successful authentication and attestation with the computing device 302, for example, by providing the management service 310 with a signed certificate chain used to sign the certificate sent to the computing device 302.

Returning briefly to FIG. 3, upon successful authentication and attestation with the computing device 302, the management service 310 may verify the computing device 302 as trusted and permit the computing device 302 to communicate within the secured computing environment. For example, the management service 310 may permit the computing device to perform a job task by starting the CopyVM 308. If the computing device serial number or a job task ID differs from when the management service 310 most recently started the CopyVM 308, the management service 310 may start a clean version of the CopyVM 308. In any instance, referring again to FIG. 4B, in CSR phase 408, the management service 310 may send the signed certificate chain to the CopyVM 308. Upon receiving the signed certificate chain, the CopyVM 308 may register with a software-as-a-service (SaaS) service selected for the job task and perform the job task for the computing device 302. Upon completion of the job task, the management service 310 stops both the AuthVM 306 and the CopyVM 308.

Computing device 302 may perform any suitable job task via the CopyVM 308. In one specific example, the authentication system 300 may permit a data migration computing device to migrate stored data to the cloud storage location 316 via the CopyVM 308.

After completion of the job task, the host server 301 may sanitize the computing device 302, retrieve the most recent virtual hard disk (which comprises a most recent operating system and software that will be installed on the computing device 302), and perform a factory reset of the computing device. As part of this process, the host server 301 may collect a new set of security artifacts from the computing device 302, as any change(s) to the operating system, firmware update(s), etc. during factory reset may also change a value of one or more security artifacts. For a computing device configured to be transported to another location (e.g., a user) and returned to the host, such as a data migration computing device, the host may again perform the arrival process each time the computing device returns to the host. During such an arrival process, the host may use the most recently obtained security artifacts collected from the computing device prior to shipping to the customer as reference values to compare to a set of security artifacts collected from the computing device 302 upon return to the host from the customer. In this manner, the disclosed examples may authenticate and verify the computing device as trusted or not trusted each time the computing device arrives at the host (or reboots while connected to an authentication system) prior to permitting communication between the computing device and a secured computing environment. This may help to protect user data and other computing systems within the secured computing environment from any potential problems that could be caused by compromise of the computing device being shipped.

Figure 5:
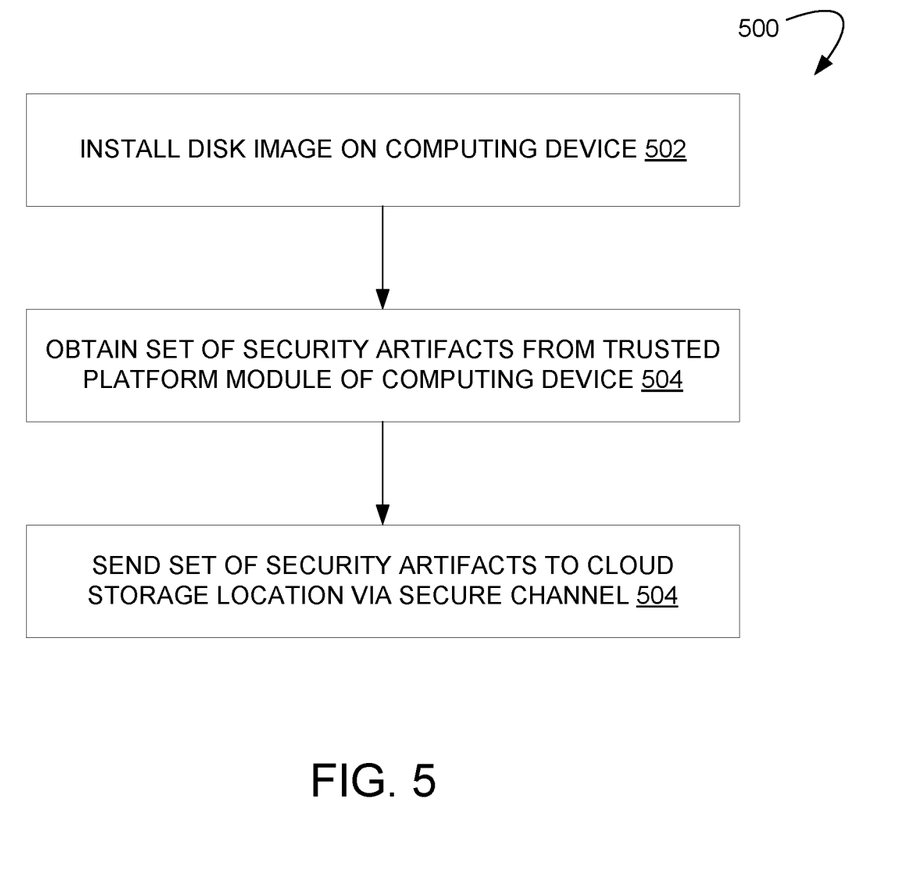
FIG. 5 shows a flowchart illustrating an example method for manufacturing a computing device.

FIG. 5 depicts an example method 500 for manufacturing a computing device, such as computing device 202 and/or computing device 302. As described above, a manufacturer may assemble a computing device according to a specification provided by a purchaser of the computing device, which includes specified firmware and/or software. Thus, at 502, method 500 comprises installing a disk image on a computing device. After installing the disk image, the computing device may reboot and undergo various setup and system configuration.

Next, at 504, method 500 comprises obtaining a set of security artifacts from the computing device. Example artifacts that may be obtained include TPM information such as an EK public key and current PCR values, and a boot log. As the PCR values may change due to updates performed during manufacturing, the set of security artifacts may occur at a stage in manufacturing at which no further configuration parameters or settings are expected to change. In this manner, the security artifacts collected during manufacturing reflect the fully installed and setup state of the computing device.

The set of security artifacts may be obtained in any suitable manner. In one example, the server which installs the disk image on the computing device may extract the set of security artifacts from the computing device and write the set of security artifacts to a local storage location. A monitoring service operatively connected to the local server (e.g., hosted on local server or connected via network to local storage location) may be configured to monitor the local storage location, detect the writing of the set of security artifacts to the local storage location, and obtain the set of security artifacts from the local storage location.

Continuing, method 500 further comprises, at 504, sending the set of security artifacts obtained from the TPM of the computing device during manufacturing to a cloud storage location from which the security artifacts may be later accessed to authenticate and verify trustworthiness of the computing device. Any suitable secure communications protocol may be used, including HTTPS. In some examples, the entity to whom the computing device is being sent after manufacturing (e.g. a cloud services host) may provide an authorization token to access the cloud storage location, such as a secure access signature (SAS) token. In some examples, method 500 comprises changing the token for uploading information to the cloud storage location (e.g. by rotating it periodically), which may help prevent unauthorized access to the cloud storage location.

The manufactured computing device next may be transported from the manufacturer to the recipient (e.g. the cloud services host in the examples described above) after security artifacts are obtained from the TPM. When the host receives the computing device, the host may assess the integrity and trustworthiness of the computing device before permitting communication between the computing device and a secured computing environment.

Figure 6:
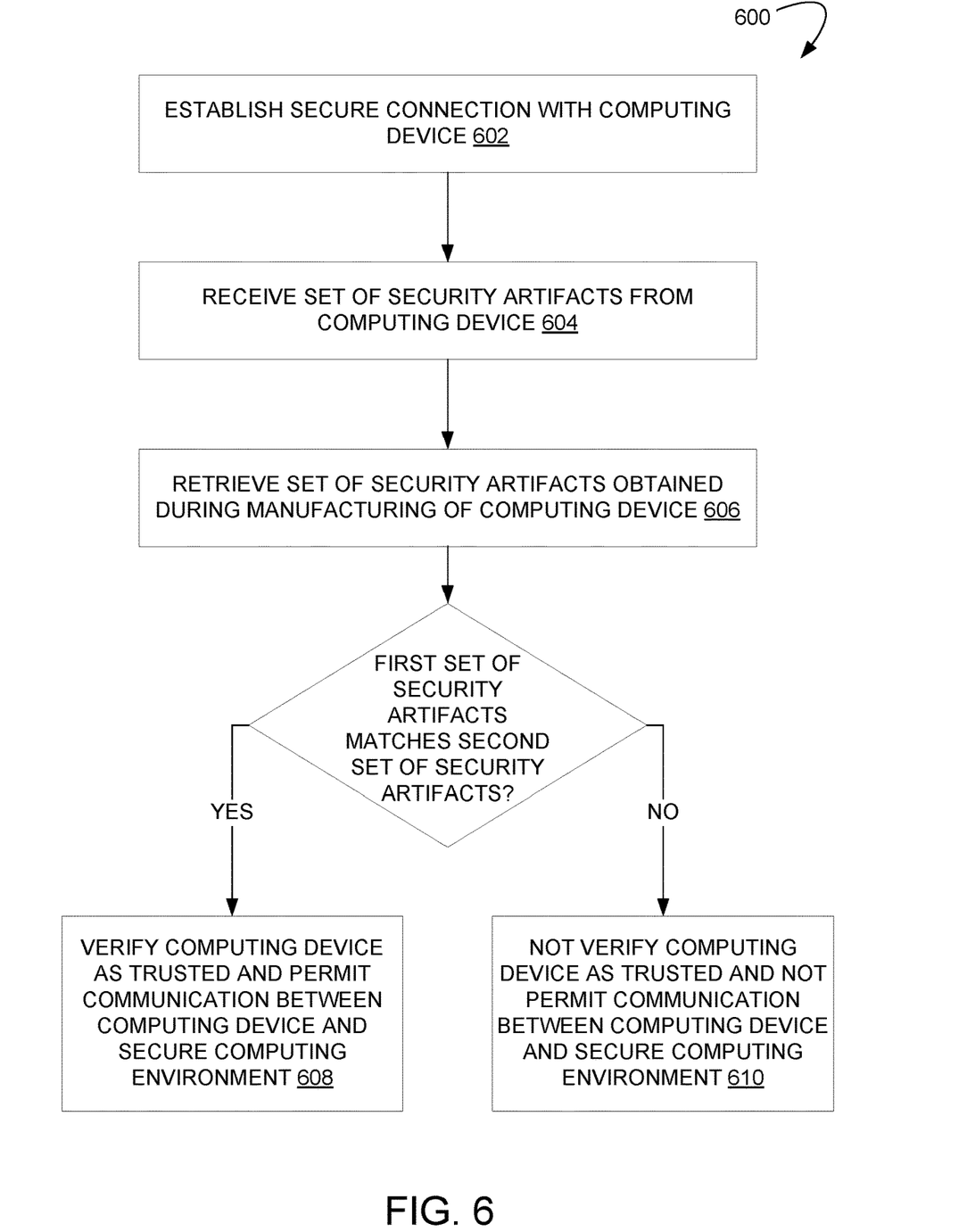
FIG. 6 shows a flowchart illustrating an example method for authenticating a computing device received from a manufacturer.

FIG. 6 depicts an example method 600 for authentication a computing device received from a manufacturer. Method 600 may be implemented as stored instructions executable by an authentication system, such as host server 301. Method 600 comprises, at 602, establishing a secure connection with the computing device, such as by using a transport layer security (TLS) connection in which the authentication system proves its identity to the computing device via a certificate. Once the secure connection is established, the computing device is isolated from communicating with devices other than the authentication system.

Using the secure connection established, the authentication system obtains information from the computing device to attest its identity and condition. Thus, at 604, method 600 comprises receiving a second set of security artifacts from the computing device, which include the artifacts in the first set obtained during manufacturing. At 606, method 600 further comprises retrieving the first set of security artifacts obtained during manufacturing of the computing device, as described above.

In a device attestation process, the authentication system compares the first set of security artifacts received from the computing device at the host to the second set of security artifacts obtained during manufacturing. Further, the authentication system may verify whether the computing device is a true owner of the EK public key rather than a spoofed device, for example, by validating an AIK or EK private key signature. When the first and second sets of security artifacts match, method 600 comprises, at 608, verifying the computing device as trusted and permitting communication between the computing device and the secure computing environment. Permitting communication between the computing device and the secure computing environment may comprise permitting the computing device to communicate with a second virtual machine that has direct cloud access, for example, to perform a job task. When the first and second sets of security artifacts do not match, method 600 comprises, at 610, not verifying the computing device as trusted and not permitting communication between the computing device and the secure computing environment. In some instances, method 600 comprises not verifying the computing device as trusted when a PCR value from the first set of security artifacts received from the computing device does not match a corresponding PCR value within the second set of security artifacts. In some such instances, method 600 may comprise identifying a likely change made to the computing device based upon the PCR value and/or providing the PCR value to a system administrator, which may help the system administrator identify a cause of the failed attestation.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
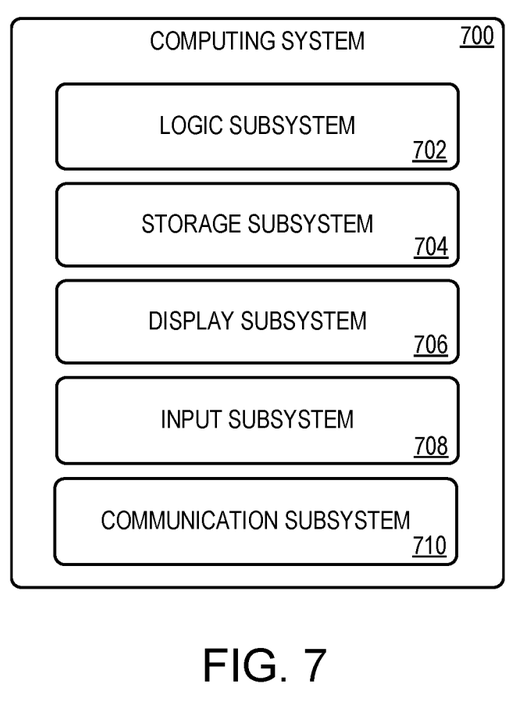
FIG. 7 shows a block diagram illustrating an example computing system.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices, including but not limited to the manufacturing site computing devices, the host computing devices, the data migration computing devices, and the other example manufactured computing devices described above.

Computing system 700 includes a logic machine 702 and a storage machine 704. Computing system 700 may optionally include a display subsystem 706, input subsystem 708, communication subsystem 710, and/or other components not shown in FIG. 7.

Logic machine 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 704 includes one or more physical devices configured to hold instructions executable by the logic machine to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 706 may be used to present a visual representation of data held by storage machine 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic machine 702 and/or storage machine 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 710 to send and/or receive messages to and/or from other devices via a network such as the Internet.

Another example provides a method for authenticating a computing device received from a manufacturer, the method comprising establishing a secured connection with the computing device, receiving from the computing device a first set of security artifacts comprising an endorsement key (EK) public key and platform configuration register (PCR) values, retrieving from a secure cloud storage location a second set of security artifacts for the computing device, the second set of security artifacts comprising the EK public key and the PCR values for the computing device obtained during manufacturing of the computing device, when the first set of security artifacts matches the second set of security artifacts, then verifying the computing device as trusted and permitting communication between the computing device and a secured computing environment, and when the first set of security artifacts does not match the second set of security artifacts, then not verifying the computing device as trusted and not permitting communication between the computing device and the secured computing environment. In such an example, establishing the secured connection with the computing device may additionally or alternatively comprise isolating the computing device such that communication between the computing device and the secured computing environment is not permitted. In such an example, the method may additionally or alternatively comprise verifying the EK public key via an attestation identity key (AIK). In such an example, establishing the secured connection with the computing device may additionally or alternatively comprise establishing the secured connection via a first virtual machine not having direct cloud access, receiving the first set of security artifacts from the computing device may additionally or alternatively comprise receiving the first set of security artifacts via the secured connection to the first virtual machine, retrieving the second set of security artifacts may additionally or alternatively comprise issuing a request for the second set of security artifacts to a management service configured to obtain the security artifacts from the secure cloud storage location, and permitting communication between the computing device and the secured computing environment may additionally or alternatively comprise permitting the computing device to communicate with a second virtual machine having direct cloud access. In such an example, retrieving the second set of security artifacts for the computing device may additionally or alternatively comprise issuing a request for the second set of security artifacts to a cloud service, the request comprising a unique identifier of the computing device, and obtaining the second set of security artifacts from a cloud storage location identified by the cloud service. In such an example, the method may additionally or alternatively comprise identifying, based on a PCR value from the first set of security artifacts received from the computing device that does not match a corresponding PCR value within the second set of security artifacts, a likely change made to the computing device. In such an example, the computing device may additionally or alternatively comprise a data migrating computing device, and permitting communication between the computing device and the secured computing environment may additionally or alternatively comprise permitting the data migrating computing device to migrate stored data to a cloud storage location.

Another example provides a method for manufacturing a computing device, the method comprising installing a disk image on the computing device, obtaining a set of security artifacts from a trusted platform module (TPM) of the computing device, the set of security artifacts comprising an endorsement key (EK) public key and platform configuration register (PCR) values, and sending the security artifacts obtained to a cloud storage location via a secure channel. In such an example, sending the security artifacts to the cloud storage location may additionally or alternatively comprise sending the security artifacts with an authorization token to access the cloud storage location. In such an example, the method may additionally or alternatively comprise changing the token usable to upload information to the cloud storage location after a period of time. In such an example, obtaining the security artifacts may additionally or alternatively comprise detecting, via a monitoring service, a writing of the security artifacts to a local storage location, and obtaining the security artifacts from the local storage location. In such an example, extracting the set of security artifacts from the TPM of the computing device further may additionally or alternatively comprise extracting a boot log.

Another example provides a computing device authentication system, comprising a disk imaging system configured to install a disk image on a computing device during manufacturing of the computing device and to extract a first set of security artifacts from a trusted platform module (TPM) residing on the computing device, a monitoring service configured to obtain the first set of security artifacts and to send the first set of security artifacts to a secure cloud storage location via a secure channel, and an authentication system configured to establish a secure connection with the computing device, receive from the computing device a second set of security artifacts for the computing device, the second set of security artifacts comprising an endorsement key (EK) public key and platform configuration register (PCR) values, retrieve from the secure cloud storage location the first set of security artifacts for the computing device, when the second set of security artifacts matches the first set of security artifacts, verify the computing device as trusted and permit communication between the computing device and a secured computing environment, and when the second set of security artifacts does not match the first set of security artifacts, not verify the computing device as trusted and not permit communication between the computing device and the secured computing environment. In such an example, the authentication system may additionally or alternatively be configured to identify, based on a PCR value in the second set of security artifacts that does not match a corresponding PCR value in the first set of security artifacts, a likely change made to the computing device after manufacturing. In such an example, the first set of security artifacts may additionally or alternatively comprise a boot log, and the authentication system may additionally or alternatively be configured to receive, from the computing device, a current boot log in the second set of security artifacts, and compare the current boot log in the second set of security artifacts to the boot log in the first set of security artifacts. In such an example, the authentication system may additionally or alternatively be configured to verify the EK public key based on an attestation identity key (AIK). In such an example, the authentication system may additionally or alternatively be configured to establish the secure connection with the computing device via a cryptographic communications security protocol that isolates the computing device from the secured computing environment. In such an example, the authentication system may additionally or alternatively be configured to establish the secure connection with the computing device via a first virtual machine not having direct cloud access, receive the second set of security artifacts from the computing device via the secure connection to the first virtual machine, retrieve the first set of security artifacts by issuing a request for the first set of security artifacts to a management service configured to obtain the first sect of security artifacts from the secure cloud storage location, and permit communication between the computing device and the secured computing environment by permitting communication between the computing device and a second virtual machine having direct cloud access. In such an example, the monitoring service may additionally or alternatively be configured to obtain the first set of security artifacts by detecting writing of the first set of security artifacts to a local storage location and obtaining the first set of security artifacts from the local storage location. In such an example, the computing device may additionally or alternatively comprise a data migrating computing device, and permitting communication between the computing device and the secured computing environment may additionally or alternatively comprise permitting the data migrating computing device to migrate stored data to a cloud storage location.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for authenticating a computing device received from a manufacturer, the method comprising:
   establishing a secured connection with the computing device;
   receiving, from the computing device, a first set of security artifacts comprising an endorsement key (EK) public key and platform configuration register (PCR) values;
   retrieving, from a secure cloud storage location, a second set of security artifacts for the computing device, the second set of security artifacts comprising the EK public key and the PCR values for the computing device obtained during manufacturing of the computing device;
   confirming that the first set of security artifacts matches the second set of security artifacts; and
   verifying the computing device as trusted and permitting communication between the computing device and a secured computing environment.

2. The method of claim 1, wherein establishing the secured connection with the computing device comprises isolating the computing device such that communication between the computing device and the secured computing environment is not permitted.

3. The method of claim 1, further comprising verifying the EK public key via an attestation identity key (AIK).

4. The method of claim 1, wherein
   establishing the secured connection with the computing device comprises establishing the secured connection via a first virtual machine not having direct cloud access,
   receiving the first set of security artifacts from the computing device comprises receiving the first set of security artifacts via the secured connection to the first virtual machine,
   retrieving the second set of security artifacts comprises issuing a request for the second set of security artifacts to a management service configured to obtain the security artifacts from the secure cloud storage location, and
   wherein permitting communication between the computing device and the secured computing environment comprises permitting the computing device to communicate with a second virtual machine having direct cloud access.

5. The method of claim 1, wherein retrieving the second set of security artifacts for the computing device comprises
   issuing a request for the second set of security artifacts to a cloud service, the request comprising a unique identifier of the computing device, and
   obtaining the second set of security artifacts from a cloud storage location identified by the cloud service.

6. The method of claim 1, further comprising identifying, based on a PCR value from the first set of security artifacts received from the computing device that does not match a corresponding PCR value within the second set of security artifacts, a likely change made to the computing device.

7. The method of claim 1, wherein the computing device comprises a data migrating computing device, and wherein permitting communication between the computing device and the secured computing environment comprises permitting the data migrating computing device to migrate stored data to a cloud storage location.

8. A method for authenticating a computing device received from a manufacturer, the method comprising:
   establishing a secured connection with the computing device;
   receiving, from the computing device, a first set of security artifacts comprising an endorsement key (EK) public key and platform configuration register (PCR) values;
   retrieving, from a secure cloud storage location, a second set of security artifacts for the computing device, the second set of security artifacts comprising the EK public key and the PCR values for the computing device obtained during manufacturing of the computing device;
   confirming that the first set of security artifacts does not match the second set of security artifacts; and
   not verifying the computing device as trusted and not permitting communication between the computing device and a secured computing environment.

9. The method of claim 8, wherein establishing the secured connection with the computing device comprises isolating the computing device such that communication between the computing device and the secured computing environment is not permitted.

10. The method of claim 8, further comprising verifying the EK public key via an attestation identity key (AIK).

11. The method of claim 8, wherein
    establishing the secured connection with the computing device comprises establishing the secured connection via a first virtual machine not having direct cloud access,
    receiving the first set of security artifacts from the computing device comprises receiving the first set of security artifacts via the secured connection to the first virtual machine,
    retrieving the second set of security artifacts comprises issuing a request for the second set of security artifacts to a management service configured to obtain the security artifacts from the secure cloud storage location, and
    wherein permitting communication between the computing device and the secured computing environment comprises permitting the computing device to communicate with a second virtual machine having direct cloud access.

12. The method of claim 8, further comprising identifying, based on a PCR value from the first set of security artifacts received from the computing device that does not match a corresponding PCR value within the second set of security artifacts, a likely change made to the computing device.

* * * * *